Sept. 4, 1962     F. E. SPENCE     3,052,030
DENTAL ARTICULATOR
Filed May 28, 1959     4 Sheets-Sheet 1

INVENTOR
FRED E. SPENCE
BY
ATTORNEY

Sept. 4, 1962  F. E. SPENCE  3,052,030
DENTAL ARTICULATOR
Filed May 28, 1959  4 Sheets-Sheet 2

INVENTOR
FRED E. SPENCE

BY Mulford A. Juten
ATTORNEY

Sept. 4, 1962 F. E. SPENCE 3,052,030
DENTAL ARTICULATOR
Filed May 28, 1959 4 Sheets-Sheet 3
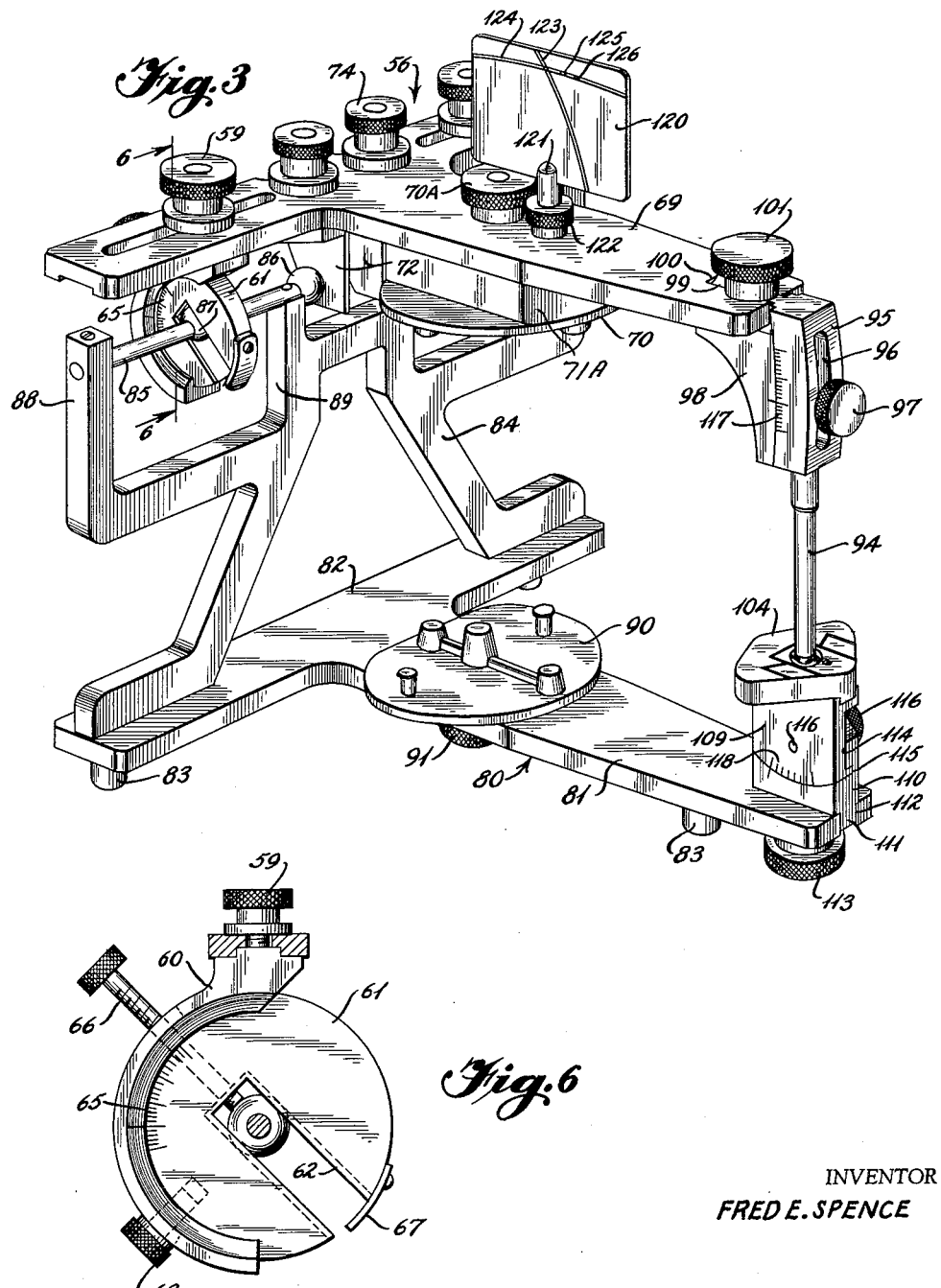
INVENTOR
FRED E. SPENCE
BY Milford A. Junten
ATTORNEY

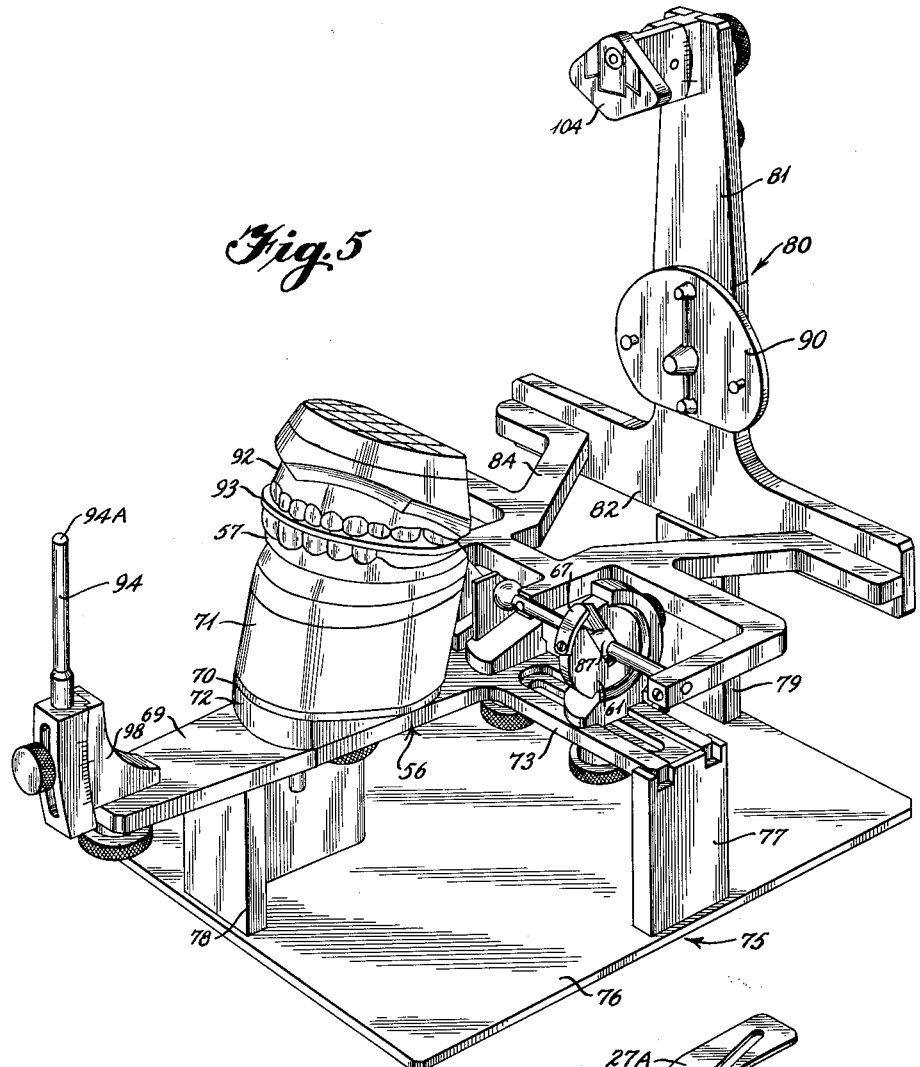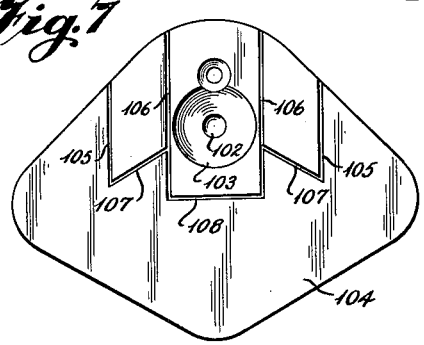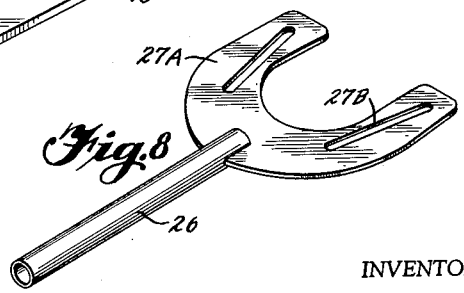

United States Patent Office 3,052,030
Patented Sept. 4, 1962

3,052,030
DENTAL ARTICULATOR
Fred E. Spence, 11535 McDonald St., Culver City, Calif.
Filed May 28, 1959, Ser. No. 816,459
11 Claims. (Cl. 32—32)

The present invention relates to apparatus and method for making accurate dentures and more particularly relates to a gnathological check bite articulator and co-operating face bow and mounting stands and jig for obtaining accurate mounting of denture models.

Heretofore, dentures have been made by taking impressions and making denture models therefrom and mounting said denture models in the upper and lower frames of a dental articulator, but the mounting of the denture models has not always been precise, because of the difficulties of getting the correct Condyle centers with relation to the dentures and, therefore the dentures furnished to patients have not been entirely satisfactory.

An object of the present invention is to overcome the difficulties enumerated above and to provide apparatus and a method for making accurate check bites to indicate jaw movements and produce satisfactory dentures.

Another object is to provide a dental articulator which accurately reproduces the movement of the jaws and includes an incisal guide which indicates the extent of an offset bite.

A further object is to provide a mounting stand for a face bow carrying a bite fork and a mounting jig for cooperating therewith for receiving the upper frame and fixing the correct position of the upper denture.

Another object is to provide an accurate reproduction of Condyle and Bennett movements and means to duplicate such movements.

A further object is to provide a face bow mounting jig which can be adjusted for variations in the hinge structure of the jaw.

Another object is to provide a mounting stand for supporting the upper frame of a dental articulator while the lower frame is mounted in a definite position with relation to the lower denture.

A further object is to provide a hinged structure which accurately reproduces the Condyle movement to provide for accurate adjustment and duplication of the jaw movement.

A further object is to provide an incisal guide which can accurately reproduce the movement of the jaws.

Figure 1:
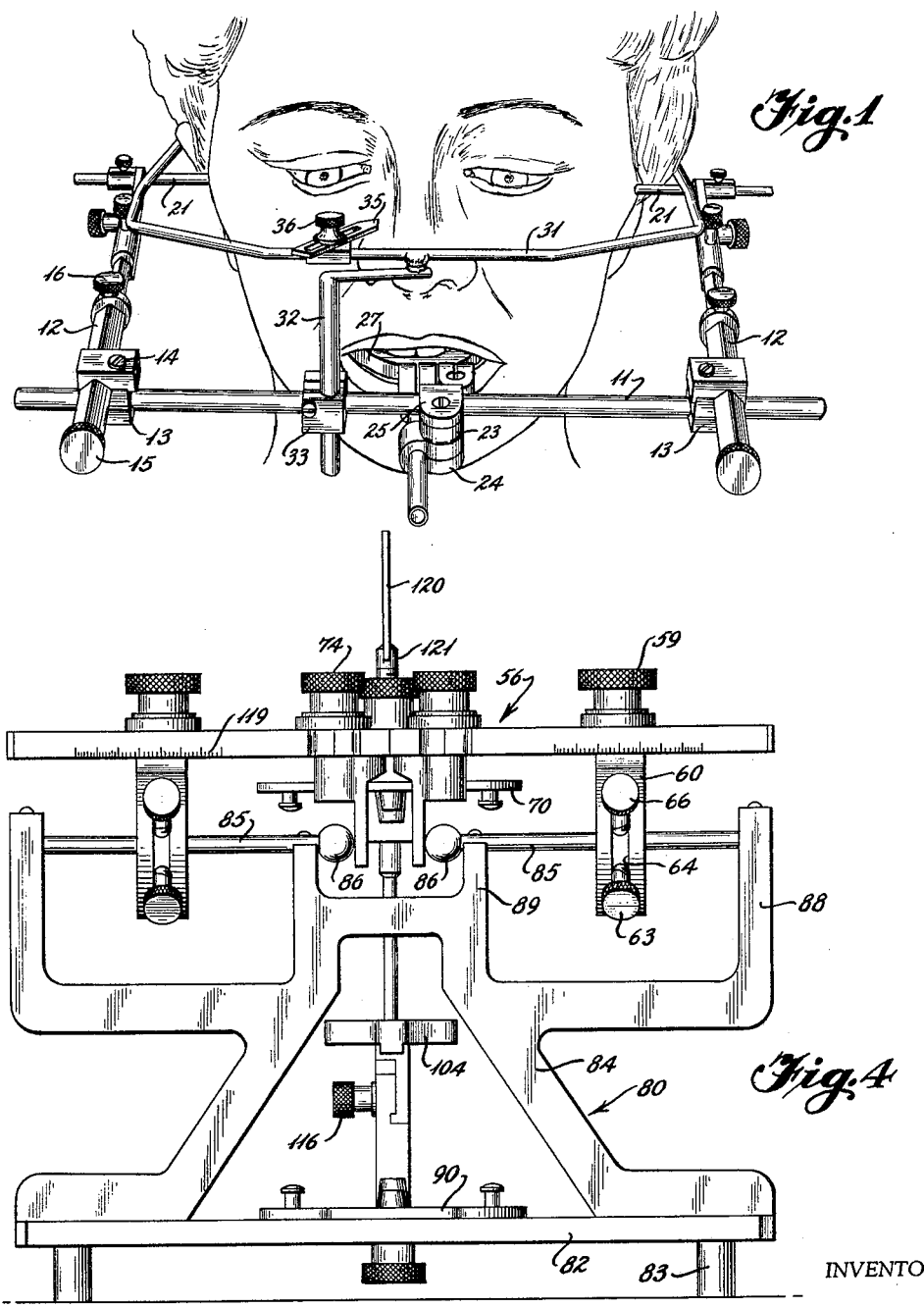
Figure 2:
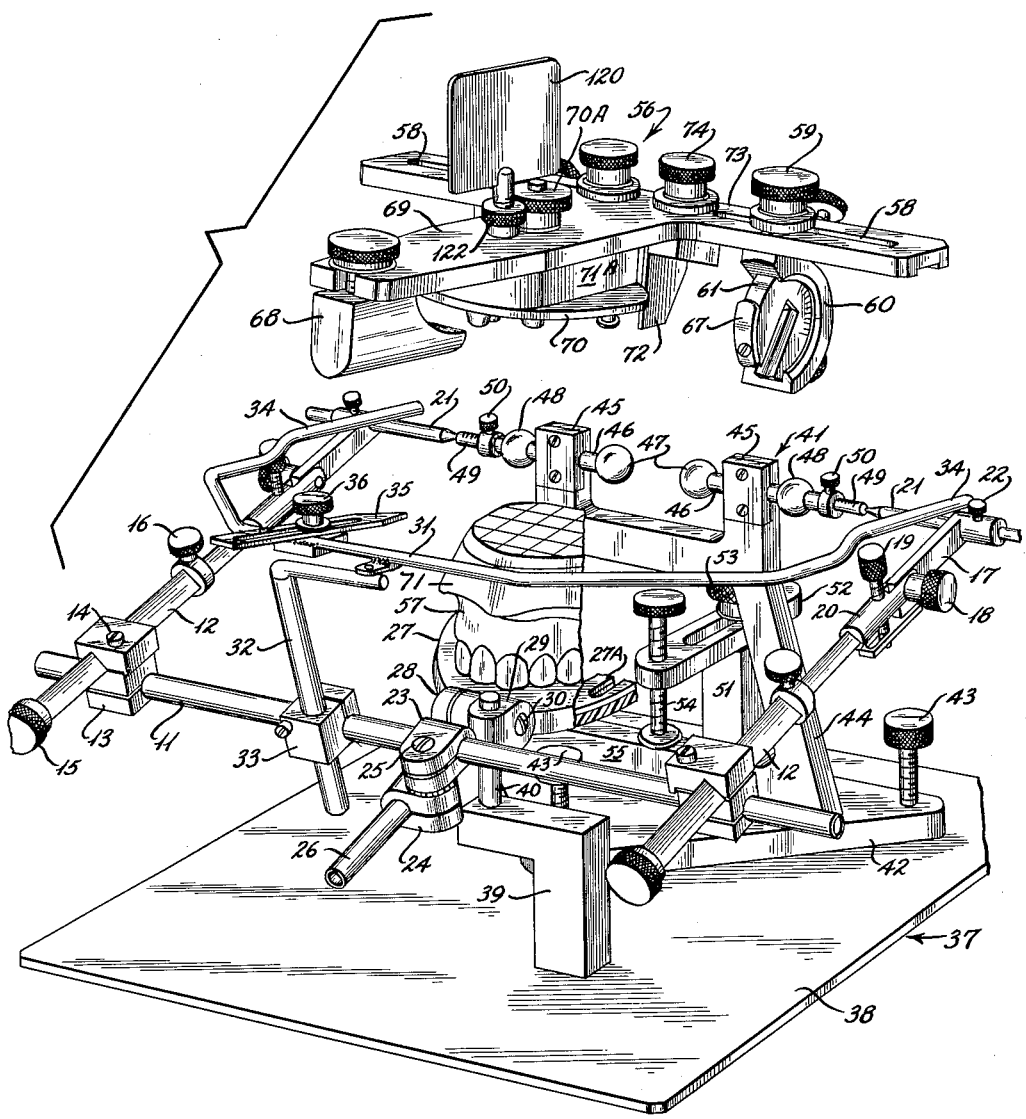

Other and further objects will be apparent as the description proceeds and upon reference to the accompanying drawings, wherein:

FIG. 1 is a front view of a face bow supported on a bite fork and positioned on a person's face to indicate the centric axis;

FIG. 2, an exploded view of the bite fork mounted on the upper mounting stand with a mounting jig fixed in position on the upper stand with the centric axis thereof on the centric axis of the face bow and showing the upper frame just prior to attachment to the mounting jig;

FIG. 3, a perspective of the dental articulator showing the upper and lower frames in closed bite position;

FIG. 4, a rear elevation of the dental articulator of FIG. 3;

FIG. 5, a perspective of the dental articulator inverted and in open position mounted on the lower frame-supporting stand with the denture fixed to the upper frame;

FIG. 6, an enlarged detail of the articulator hinge joint taken substantially on line 6—6 of FIG. 3;

FIG. 7, a plan view of the incisal guide; and

FIG. 8, a perspective of the of the bite fork.

Briefly, the present invention comprises a dental articulator having upper and lower frames connected together by means of axially aligned shafts on an upstanding framework on the lower frame and carrying fixed balls at their adjacent ends and movable balls intermediate the shaft ends, while the upper frame carries transversely adjustable arcuate straps which adjustably receive slotted disks, the slots of which disks receive the slidable balls, thereby providing for the Condyle movement between the upper and lower frames. An incisal guide on the opposite end of the lower frame and an incisal pin on the opposite end of the upper frame cooperate to guide the movement and suitable markings on the incisal guide predetermine the desired movement to be made.

The invention also includes an upper frame mounting stand for a face bow and its fork bite, and adjustable mounting jig for the face bow and upper frame and a lower frame to assure accurate mounting of the denture models in the articulator. The method of using the various items of equipment and the order in which they are used provides for accurate shaping and completion of a set of dentures.

Upon detailed reference to the drawings, a face bow shown in FIGS. 1 and 2 comprises a horizontal cylindrical rod 11 receiving telescoping rectangular side rods 12 in adjustable fitting 13 which are fixed in position by clamping screws 14. The telescoping rods 12 are adjustable as to length by adjusting knobs 15 and are held in adjusted position by clamp screws 16. A center carrying-arm 17 is pivotally mounted on the free end of the telescoping rod 12 for movement about a clamp screw 18, the pivotal movement being obtained by a screw 19 threaded into a socket extension 20 on the telescoping rod 12. A center pin 21 is slidably mounted in a boss at the free end of pivoted arm 17 and held in adjusted position by a screw 22.

A universal type of clamp including a first clamp 23 received on an intermediate portion of the horizontal rod 11 supports a second clamp 24 by means of a screw to obtain a clamping action fixing the clamp relative to horizontal rod 11, the clamp 24 also receiving a tubular rod 26 for sliding and rotational adjustment therein and carrying a bite fork 27A on which the check bite 27 is mounted. The rod 26 also carries a pair of clamps 28 and 29 which are secured by a clamping screw 30 for supporting the bite fork on the upper mounting stand hereinafter described.

The bite fork 27A is shown in FIG. 8 and includes the tubular rod 26 which is slit at its inner end and embraces the outside bight portion of the U-shaped body of the bite fork and such U-shaped body includes slots 27B which serve to anchor the check bite 27 in position.

An orbital movement plane indicator comprises a U-shaped rod 31 fixedly mounted on an inverted L-shaped bracket 32 adjustably supported by a clamp 33 providing for vertical sliding and rotating movement of the bracket 32 and rotatable and slidable movement relative to rod 11, the U-shaped rod 31 having offset portions 34 which rest on Condyle center pin 21. An orbital plane pointer 35 having a slot therein is slidably and pivotally mounted by means of a screw 36 passing through the slot and threaded into a block fixed to the U-shaped rod 31 to accurately point to the Condyle center and thereby determine the orbital movement plane.

In use the face bow is provided with the check bite 27 on the bite fork and the patient makes a normal bite with the lower jaw retruded. The patient then moves the lower jaw carrying the face bow therewith and the dentist makes the proper adjustment to accurately indicate the Condyle center so that such Condyle center coincides with pins 21 of the face bow, suitable adjustment being made to vary the length of the telescoping rod 12 and vertical displacement by means of the pivotal arms 17 until the center points 21 remain fixed at the center during the opening and closing movement of the lower jaw in the retruded position, thereby accurately defining the center with relation to the check bite 27 of the lower jaw. When this is accurately determined and the adjustments are fixed by locking the clamping screws the face bow is removed from the patient and mounted on an upper mounting stand 37.

The upper mounting stand 37 includes a base plate 38 on which an inverted L-shaped bracket 39 is fixed and carries a face bow mounting pin 40 which extends upwardly and is received by the clamp 29 and when the face bow is in approximately its correct position the clamp screw 30 is tightened, thereby clamping the clamps 28 and 29 and securely supporting the face bow on the upper mounting stand 37.

A mounting jig 41 having a triangular shaped base 42 is provided with a leveling screw 43 at each apex of the threaded through threaded apertures in the base for engagement with base plate 38 of the upper mounting stand. The mounting jig 41 includes a trapezoidal shaped upstanding frame 44 fixed to the triangular base and has upstanding extensions 45 which support tubular shaft 46 arranged in axial alignment with balls 47 at their inner ends and balls 48 slidably mounted on their outer ends, the shafts 46 being secured by clamping plates held in position by screws secured to the upward extension 45. Concave centers 49 are telescopically mounted in the tubular frame 46 and are held in adjusted position by set screws 50 so that the concave centers at the end of telescoping center 49 may accurately engage the convex conical centers of the pins 21 of the face bow, the leveling screws 43 providing for accurately aligning the centers to avoid strain of the face bow, the telescoping feature of the concave centers 49 serving to provide the proper axial length corresponding to the face width, the scale thereon providing for centering.

When the mounting jig 41 is accurately positioned such mounting jig is clamped to the base plate 38 of upper mounting stand 37 by means of a clamping structure including an upstanding post 51 fixed to the base plate 38, on which post a slotted arm 52 is adjustably secured by a screw 53 threaded into the post 51 and passing through the slot in the slotted arm 52, the free end of the slotted arm 52 having a screw 54 threaded therethrough and having an operating knob at its upper end and a swivel flange at its lower end, whereby the base frame element 55 of the upstanding trapezoidal frame 44 of the mounting jig can be engaged by screw 54 and securely clamped to the base 38, thereby securing the mounting jig 41 in fixed position.

After the mounting jig 41 and the bite fork are fixed with the relation to the upper mounting stand 37 the upper frame 56 of the dental articulator is mounted in a definite position and the upper denture model 57 fixed to the upper frame. The upper frame 56 of the articulator is T-shaped and the cross bar thereof is provided with a slot 58 on each arm. A screw 59 passes through each slot and is threaded into a mounting block having a tongue projecting into the slot and a circular channel-shaped strap 60, which channel shaped strap snugly and rotatably receives a disk 61 having a radially extending slot 62, such slot 62 being shaped to slidably and rotatably receive the associated ball 48. Each disk 61 is secured in adjusted position to its strap by a clamping screw 63 passing through a slot 64 in the periphery of strap 60, the adjustment of the disk 61 with respect to the strap 60 being indicated by graduations 65 on the disk and a cooperating mark on the strap. An elongated displacement control screw 66 freely passing through slot 64 is threaded into the disk 61 in radial alignment with slot 62 engaging the cooperating ball to thereby limit the position of the disk with respect to the ball 48 on the mounting jig or the corresponding ball 87 on the lower frame.

A pivoted stop 67 is mounted by means of a screw to extend across the open end of the slot 62 or to be pivoted out of the way (FIG. 2) to permit mounting of the upper frame 56 on the mounting jig or on the lower articulator frame with the stop 67 serving to retain the upper and lower frames in connected relation. The upper frame is mounted on the jig 41 by disks 61 receiving the balls 48 so that the center of the disks 61 is substantially coincident with the centers of balls 48 and the shaft 46. An orbital plane positioning block 68 is mounted at the free end of the stem portion 69 of the upper frame 56, such block 68 resting on the bite portion of the U-shaped orbital plane determining rod 31, thereby fixing the upper frame 56 in a definite position with respect to the upper denture model 57 and in this position the upper denture model 57 is securely attached to a plate 70 by means of plaster of Paris or the like filling material 71 which fills the intervening space, a suitable spacer 71A being provided between the plate 70 and the stem portion 69 of the upper frame. The plate 70 is releasably mounted on the upper frame by means of screw 70A (see FIG. 3).

To limit the lateral movement of the upper frame 56 with respect to the mounting jig inverted L-shaped members 72 are secured to the center portion of the cross bar 73 of the upper frame by means of screws 74 passing through an opening in such cross bar and being threaded into the base portion of the associated L-shaped member 72, such members engaging the balls 47 of the mounting jig or balls 86 of the lower frame to prevent axial movement while permitting sliding movement between the balls 48 or balls 87 and the disks 61 corresponding to the Condyle movement, but in the initial mounting of the denture model 57 the position of the upper frame 56 is fixed with respect to the mounting jig 41 and the bite fork.

After the upper denture model 57 is fixed to the upper frame 56 such upper frame is mounted on a lower mounting stand 75 (FIG. 5) which includes a base 76 on which a pair of upstanding posts 77 are mounted to receive the outer ends of the cross bar 73 of the inverted upper frame 56, the upper ends of the posts 77 being provided with rectangular recesses which engage the upper surface, sides and end of the associated arm of the cross bar. The stem 69 of the upper frame is supported on a post 78, thereby accurately supporting the upper frame 56 on a three-point support. A fourth post 79 extends upwardly from the rear portion of the base 76 for engaging the cross bar 82 of lower frame 80 of the articulator.

The lower frame 80 comprises a T-shaped base having a stem 81 and a cross bar 82 with a foot 83 on each arm to provide a support therefor and an upstanding framework 84 extending upwardly from the lower frame base and supporting shafts 85 in axial alignment thereon. Such shafts are provided with balls 86 on their inner ends and with balls 87 slidably mounted intermediate the ends of the shafts, such balls corresponding to balls 47 and 48 on the mounting jig.

Each shaft 85 is supported in upright struts 88, having a bore therethrough for receiving the outer end of the shaft and a strut 89 having a semi-cylindrical recess at the upper end receiving the shaft with the shaft secured by a screw or the like in such recess.

A lower denture model supporting plate 90 is releasably secured to the stem portion 81 by a screw 91 passing through an aperture in the stem and into a threaded aperture in the plate 90, suitable indexing means being provided to insure accurate positioning of the plate 90.

As shown in FIG. 5, the lower articulator frame 80 is mounted on the upper frame and the cross bar 82 of such lower frame rests on the post 79 with the stem portion 81 extending upwardly, whereby the technician can accurately position the lower denture model 92 on the check bite 93, thereby obtaining registration of the upper and lower denture models 57 and 92. The lower frame 80 is then pivoted about pivot balls 87 so that the upper and lower articulator frames are in substantially the relation shown in FIG. 3, but are inverted.

The incisal pin 94 and its cooperating guide 104 serve to limit the closing movement of the articulator frame and the lower denture model 92 is secured to the plate 90 in the usual manner, thereby assuring the correct rest retruded position of the check bite and of the models in the articulator frame.

To accurately determine the angular position of the upper and lower articulator frames 56 and 80 an incisal pin 94 is fixed to an arcuate shaped T-section block 95 having a radial slot 96 through which a clamping screw 97 passes, said screw being threaded into a threaded bore in an arcuate channel surface of a gusset-shaped bracket 98 which is slidably mounted by means of an upwardly extending tongue 99 received in a radially extending slot 100 at the free end of the stem portion 69 of the upper frame, the gusset-shaped bracket 98 being secured in position by a clamping screw 101 threaded into the gusset block, thereby providing for removable mounting of the incisal pin 94 and replacement by the orbital plane determining block 68. The lower end of the incisal pin is 3/16 of an inch in diameter with a 3/32-inch radius at the free end thereof which is received in a cooperating recess 102 at the bottom of a flaring opening 103 in an incisal guide plate 104, the depth of the openings being approximately 3/16-inch each to correspond to the jaw opening resulting from the Bennett movement. The incisal guide plate 104 has a pair of parallel lines 105 at the lateral sides and a pair of parallel lines 106 inwardly thereof with diagonal lines 107 extending radially relative to the recesses 102, 103 and extending between the inner and outer parallel lines while a cross line 108 connects lines 106. These lines are preferably formed by a milling action or the like to produce a groove which is also marked with a paint or the like and which lines can be followed by the rounded tip 94A of the incisal pin. The incisal guide 104 is preferably made of plastic and is mounted on the upper edge of a plate 109 countersunk by a screw 109A. The plate 109 is mounted for arcuate movement about the center of recess 102 on a block 110 having a tongue 111 extending into a radially-extending slot 112 in the free end of the stem 81 of the lower articulator frame, the mounting block 110 being secured by a clamping screw 113 passing through the slot 112 and threaded into the block 110, thereby permitting radial adjustment to assure that the tip end 94A of incisal pin 94 will be accurately received in the recess 102. The plate 109 is provided with an arcuate groove 114 and a tongue at the lower edge thereof, while the block 110 is provided with an arcuate-shaped groove 115 which receives the tongue of the plate 109 and the plate 109 is secured in adjusted position by a clamping screw 116 passing through an arcuate slot in the block 110 and being threaded into the plate 109, it being apparent that the center of the arcs is substantially at the bottom of the recess 102 and at the tip 94A of the incisal pin, thereby permitting adjustment of the angularity of the incisal guide 104 and permitting spacing adjustment between the upper and lower frames by the arcuate movement of incisal pin-supporting block 95. It will be noted that a scale 117, a scale 118, the scale 65 and a scale 119 provide for the necessary adjustment of the parts and make it possible for the dentist to accurately duplicate any adjustment.

From the above description it is believed that the use of the apparatus is sufficiently described, but to summarize, in making an accurate mounting and an accurate reproduction of the Condyle and Bennett movements the face bow is positioned on a person's face with an accurate check bite made on the check bite fork with the lower jaw in retruded position. The dentist accurately locates the center pins 21 by causing the lower jaw to open and close in its retruded position while the lower jaw supports the face bow and when the centers 21 are correctly positioned by suitable manipulation of the telescoping adjustment 12 and the angular adjustment 17 so that the center pins 21 remain axially stationary as the jaw is opened and closed in retruded condition the center is established and the adjustments kept by tightening the clamping screws. Then with the jaw closed the orbital plane U-shaped indicating rod 31 is adjusted so that the free offset ends thereof engage the center pins 21 and the orbital plane pointer 35 is located at the correct elevation with respect to a person's nose. The clamp 33 is tightened to retain the rod 31 in position. The clamping screws are preferably of the Allen head type although slotted head screws are shown for simplicity. The parts being clamped together, the face bow is removed from the patient and mounted by means of clamps 28 and 29 on the pin 40 of upper frame mounting stand 37 and the mounting jig 41 is adjusted by means of its leveling screw to bring the centers 49 thereof into alignment with center pins 21 and the mounting jig 41 is clamped in position by clamping screw 54. The upper denture model 57 is then positioned on the check bite 27 supported on bite fork 27A. The upper articular frame 56 with the orbital plane positioning block 68 mounted on the stem end thereof is then mounted on the mounting jig 41 with the balls 48 being received in slots 62 of the disks 61, the block 68 resting on the U-shaped rod 31, thereby determining the proper position of the upper frame with respect to the upper denture model 57, the denture model 57 being fixed to the upper frame by the plastic material 71 which fills the space between the upper denture model 57 and the plate 70.

Thereafter the block 68 is replaced by the incisal pin mounting arrangement including the gusset bracket 98. The upper frame 56 is mounted in inverted position on the lower mounting stand 75 and a retruded normal check bite 93 is placed on the biting surface of the upper model 57. The lower frame 80 is then mounted on the upper frame and such lower frame is held in connected position to the upper frame 56 by pivoted stops 67 on the slotted disks 61. The cross bar 82 of the lower frame rests on the post 79 to provide for manipulation of the parts and the lower frame 80 is closed on the upper frame to substantially the condition shown in FIG. 3 but the articulator is in inverted position. The lower denture 92, which has been positioned on the check bite 93, is then secured to the plate 90 by plaster of Paris or the like, the closing position of the parts being determined by the engagement of the incisal pin 94 with the incisal guide 104.

The articulator is then placed in its normal position shown in FIG. 3 and the normal check bite 93 removed. An offset check bite is then made in the articulator with the incisal pin 94 offset from the recess 102, to one side, to the point of intersection of lines 105 and 107 of the incisal guide 104 corresponding to the normal offset in the Bennett movement and such check bite is then removed from the articulator and placed in the patient's mouth, the dentist moving the patient's lower jaw to cause the teeth to register in the offset bite and the patient then alters the articulator made offset bite, making the patient's normal offset bite in such check bite and the patient-altered check bite is returned to the articulator where the dentist makes the necessary adjustments to give the correct offset movement in the articulator to correspond with the offset bite of the patient.

It will be evident that the suitable adjustments can be obtained by the adjustments previously described and that the models can be removed from the articulator and replaced therein with the correct adjustment, thereby assuring identical reproduction of the movement in the event that the articulator must be used for several different sets of dentures.

From a study of the models and from the movements reproduced it will be evident that applicant has provided a more accurate and effective apparatus and method for reproducing movements of the jaws to simplify the production of dentures.

A further advantage of the present invention is the accurate determination of the occlusal plane and of the anterior posterior curve of such occlusal plane. This is obtained by means of a plate-like element 120 called a semaphore which is supported by a threaded shank 121 threaded into the stem 69 of the upper frame and locked in position by a knurled nut 122. To determine the occlusal plane, a caliper is used and adjusted between the axis of the articulator by measuring the distance from the axis ball 87 to the median line of the upper anterior teeth at their common incisal edge. When the caliper is set to the distance between these points, it is first held against the ball 87 on one side and a line 123 scribed on the semaphore 120. Then the center point of the caliper is held at the incisal edge at the median line of the upper anterior teeth and a second arc 124 is scribed making sure to keep the same setting of the caliper.

Although the dentures are not shown in place in FIG. 3, it will be apparent that the anterior posterior curve of the occlusal plane can be determined by using the same setting of the caliper and measuring selected portions of the anterior posterior curve and marking one or more points 125 or 126 corresponding to the incisal edge of particular teeth thereby determining the anterior posterior curve of the occlusal plane and also accurately determining such occlusal plane. It will be evident that similar arcs and points 123—126 can be made on the other side of the semaphore 120.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A method of making an accurate duplication of teeth comprising making upper and lower denture models of the patient's teeth, making a check bite on a bite fork to obtain accurate registration of the upper and lower sets of teeth, mounting a face bow on the bite fork and locating the axis of the retruded jaw by observation of the arc of the center pins of the face bow and adjusting the center pins on the face bow to the axis of the retruded jaw so the center pins maintain a fixed position as the lower jaw is pivoted in retruded position and accurately fixing such centers on the face bow, mounting the face bow with the bite fork and check bite on a support and positioning an upper frame mounting jig in a definite relation to the face bow so that the centers of the face bow are on the centers of the upper frame mounting jig, clamping said jig in fixed relation to the face bow and placing the upper articulator frame on the mounting jig, placing the upper denture model on the upper bite surface of the bite check and fixedly securing the upper denture model to the upper frame, mounting said fixed assembled upper denture model with the upper frame on a lower mounting stand in which the upper articular frame is inverted, placing the normal check bite on the inverted upper denture model, placing the lower denture model on the normal check bite and mounting the lower articulator frame on the upper articulated frame in its correct retruded jaw outer position, fixedly securing the lower denture model to the lower frame thereby providing the accurate reproduction of the normal bite of the retruded jaw of the patient, removing the articulator from the lower mounting stand with the denture models in place, making an offset check bite between the upper and lower denture models in the articulator, transferring such offset check bite to the mouth of the patient and offsetting the patient's jaw to substantially the amount of offset of the articulator so the patient's teeth register with the offset check bite and causing the patient to modify the offset check bite thereby compensating for variation between the offset check bite of the articulator and the offset check bite of the patient, removing the patient modified check bite from the patient and replacing it on the denture models in the articulator and making the necessary adjustments to provide for the accurate reproduction of the offset bite by the articulator whereby the technician can accurately reproduce the correct shape for the dentures.

2. A dental articular comprising an upper and lower frame, said lower frame having a base and an upstanding framework projecting from one end of said base, a shaft mounted on the upper end of said framework at each side thereof in axial alignment and terminating adjacent each other, a ball rotatably and slidably mounted on each shaft, an upper frame having a crossbar at one end overlying said upstanding framework of said lower frame, a pair of downwardly extending guide members mounted on said crossbar and engaging the inner ends of said shaft to limit axial movement of said upper frame relative to said shafts, a slotted disk embracing each shaft and the associated ball and slidably receiving the associated slidable ball, an arcuate-shaped disk-retaining member on each arm of said cross-bar surrounding a major portion of the associated slotted disk, means to secure the slotted disk to its associated arcuate member, means to adjust each slotted disk to vary the position of the ball in the slot thereof to provide for projection of the jaw, means to adjust each disk retaining member on its associated arm, cooperating means on the other end of said upper and lower frames for determining the position of the frames and thereby the position of the denture models carried by the frames.

3. The invention according to claim 2 in which the arcuate embracing members are axially adjustable on the associated arms of the crossbar of the upper frame.

4. The invention according to claim 2 in which an incisal pin is mounted on the other end of one of said frames and an incisal guide is mounted on the other end of the other of said frames and said pin and said guide can be accurately moved to correspond to jaw movements.

5. A pivotal mount for obtaining the Condyle and Bennett movements comprising a lower frame having an upstanding framework at the rear thereof, a pair of shafts mounted on the upstanding framework in substantial axial alignment with the inner ends spaced apart, means to secure said shafts in fixed relation, a ball secured to the inner end of each shaft, a ball slidably mounted on each shaft between the ends thereof, a circular disk having a slot extending radially and opening at one edge of said disk receiving each slidable ball, the slot having cylindrical shaped surfaces to snugly receive the ball associated therewith and to prevent relative axial movement while permitting the disk to slide radially relative to its associated ball, said radial slot being of such dimensions that the axis of said shaft and slidable ball may be in coincidence with the axis of said disk, a strap surrounding a substantial portion of said disk, means to secure the strap in fixed position to said disk whereby the slot may extend at varying angles with respect to said strap, an upper mounting frame on which an upper denture model may be supported, said upper frame having a stem and a crossbar forming two arms, each strap being carried by the associated arm of said upper frame, means to secure each strap in a definite position on said upper frame corresponding to the spacing of the Condyle centers of a patient, a pair of plates, each plate mounted on the upper frame to cooperate with the associated ball on the inner end of the associated shaft to obtain the desired movement of the upper and lower frames corresponding to the relative movement between the upper and lower jaws, means to adjust the position of the disks with respect to the cooperating ball to limit movement of said disks in one direction.

6. A face bow comprising a horizontal base rod, a side rod mounted on each end of said base rod in substantially the same plane, means to extend and retract said side rods, a center carrying arm pivotally mounted in a yoke on the free end of each side rod, means to adjust the pivotal movement of said center carrying arms, means to positively retain the adjusted length of said side arms and the adjusted positions of said pivoted center carrying arms, centers slidably mounted on the free ends of said center carrying arms, a bite fork adjustably mounted on said base rod for universal angular movement and for projection and retraction whereby an accurate relation can be obtained between the position of the bite fork and the centers, and adjustable mounting elements secured to the bite fork for mounting on an upper frame mounting stand, an orbital movement plane indicator comprising a U-shaped rod having its legs spaced apart a distance at least equal to the spacing between the centers of the face bow and of a depth to receive the portion of a person's face between the Condyle centers and the front of the face with the free ends of the legs of the U-shaped rod engaging the centers of the face bow, means supporting the U-shaped orbital plane indicator rod from the base rod.

7. An arrangement for obtaining the proper mount of the upper denture on the upper frame of an articulator having upper and lower frames, said arrangement including an upper frame mounting stand having a base plate, an inverted L-shaped support mounted on said base plate and having an upstanding rod mounted on the free end of the L-shaped support for engagement with a bite fork and face bow mounting element to thereby secure the bite fork in proper position, a mounting jig corresponding to the lower frame of the articulator, said jig having a base, a plurality of leveling screws on said base engaging the base plate of the upper mounting stand, said mounting jig having a pair of shafts in alignment and having centers on the outer ends of such shafts for engagement with the center pins of the face bow when the face bow is supported from said upper mounting stand, a clamp on said upper mounting stand securing said jig to said upper mounting stand thereby securing the face bow supporting the upper denture in fixed position with respect to the center, and an upper mounting frame cooperating with the center of the mounting jig whereby the upper denture may be fixed to the upper articulator frame.

8. An arrangement for obtaining the proper mount of the upper denture on the upper frame of an articulator having upper and lower frames, said arrangement including an upper frame mounting stand having a base plate, a support mounted on said base plate and having an upstanding rod for engagement with a bite fork and face bow mounting element to thereby secure the bite fork in proper position, a mounting jig corresponding to the lower frame of the articulator, said jig having a base, a plurality of leveling screws on said base engaging the base plate of the upper mounting stand, said mounting jig having a pair of shafts in alignment and having centers on the outer ends of such shafts for engagement with the center pins of the face bow when the face bow is supported from said upper mounting stand, a clamp on said upper mounting stand securing said jig to said upper mounting stand thereby securing the face bow supporting the upper denture in fixed position with respect to the center, an upper mounting frame cooperating with the center of the mounting jig whereby the upper denture may be fixed to the upper articulator frame.

9. An articulator comprising a lower frame, an upper frame pivotally mounted on said lower frame for obtaining the Condyle and Bennett movements, a bracket mounted on said upper frame and having an arcuate surface substantially concentric with the pivotal center of said upper and lower frames, an incisal pin mounting block having a curvature cooperating with the curvature of said bracket, an incisal pin mounted on said incisal pin mounting block, said incisal pin having a tapered free end, said structure providing that the free end of the incisal pin will be located at a substantially constant distance from the pivotal center between said lower and upper frames, an incisal guide mounted in said lower frame and having a tapered recess for cooperation with the tapered end of said incisal pin for definitely locating the upper and lower frames, means to mount said incisal guide on said lower frame, said means including a block on said lower frame, a mounting plate mounted on said block on said lower frame for movement about an axis substantially through the tapering recess in said incisal guide whereby the incisal guide will have its tapering recess at a substantially constant location with respect to pivotal axis between said upper and lower frames.

10. The invention according to claim 9, in which a pair of radiating grooved lines extend outwardly from said tapered recess and corresponding to the Bennett movement, and lines transverse to said radial lines.

11. The invention according to claim 9, in which the connection between the incisal guide and the incisal guide mounting plate includes a rib in one of said incisal guide and mounting plate and a groove in the other of said incisal guide and mounting plate.

References Cited in the file of this patent

UNITED STATES PATENTS

| | | |
|---|---|---|
| 1,669,462 | Gambill | May 15, 1928 |
| 1,684,393 | Gysi | Sept. 18, 1928 |
| 1,703,105 | Hawksworth | Feb. 26, 1929 |
| 1,733,507 | McCollum | Oct. 29, 1929 |
| 1,812,031 | Bjorklund | June 30, 1931 |
| 2,235,524 | Lentz | Mar. 18, 1941 |
| 2,603,869 | Bjorklund | July 22, 1952 |
| 2,670,538 | Thompson | Mar. 2, 1954 |
| 2,701,915 | Page | Feb. 15, 1955 |
| 2,797,483 | Lisowski | July 2, 1957 |
| 2,806,284 | Stuart | Sept. 17, 1957 |

OTHER REFERENCES

Dalber: Dental Cosmos; pages 269–275 (page 274 relied upon), volume 56; 1914. (Copy in Scientific Library.)